United States Patent
Shamoun et al.

(10) Patent No.: US 7,413,272 B2
(45) Date of Patent: Aug. 19, 2008

(54) METHODS AND APPARATUS FOR PRECISION CONTROL OF PRINT HEAD ASSEMBLIES

(75) Inventors: Bassam Shamoun, Fremont, CA (US); Janusz Jozwiak, San Ramon, CA (US); Quanyuan Shang, Saratoga, CA (US); Hongbin Ji, Santa Clara, CA (US)

(73) Assignee: Applied Materials, Inc., Samta Clara, CA (US)

( * ) Notice: Subject to any disclaimer, the term of this patent is extended or adjusted under 35 U.S.C. 154(b) by 463 days.

(21) Appl. No.: 11/061,120

(22) Filed: Feb. 18, 2005

(65) Prior Publication Data

US 2006/0092207 A1  May 4, 2006

Related U.S. Application Data

(60) Provisional application No. 60/625,550, filed on Nov. 4, 2004.

(51) Int. Cl.
   *B41J 29/38* (2006.01)
(52) U.S. Cl. .............................. 347/14; 347/11; 347/15
(58) Field of Classification Search .................. 347/11, 347/14, 15, 57, 8
   See application file for complete search history.

(56) References Cited

U.S. PATENT DOCUMENTS

| | | | |
|---|---|---|---|
| 4,987,043 A | 1/1991 | Roosen et al. |
| 5,114,760 A | 5/1992 | Takemura et al. |
| 5,177,627 A | 1/1993 | Ishiwata et al. |
| 5,232,634 A | 8/1993 | Sawada et al. |
| 5,232,781 A | 8/1993 | Takemura et al. |
| 5,264,952 A | 11/1993 | Fukutani et al. |
| 5,340,619 A | 8/1994 | Chen et al. |
| 5,399,450 A | 3/1995 | Matsushima et al. |
| 5,432,538 A | 7/1995 | Carlotta |
| 5,552,192 A | 9/1996 | Kashiwazaki et al. |
| 5,554,466 A | 9/1996 | Matsushima et al. |
| 5,593,757 A | 1/1997 | Kashiwazaki et al. |
| 5,626,994 A | 5/1997 | Takayanagi et al. |
| 5,648,198 A | 7/1997 | Shibata |
| 5,702,776 A | 12/1997 | Hayase et al. |
| 5,705,302 A | 1/1998 | Ohno et al. |

(Continued)

FOREIGN PATENT DOCUMENTS

EP  0 675 385 A1  10/1995

(Continued)

*Primary Examiner*—Thinh H Nguyen
(74) *Attorney, Agent, or Firm*—Dugan & Dugan (57) ABSTRACT

The present invention provides methods and apparatus for controlling the quantity of fluid output (e.g., drop size) by individual nozzles of a print head to a very high precision at a frequency equal to the frequency at which fluid is normally dispensed. This is achieved by mapping fluid quantity control information into the data that represents the image to be printed. Data representative of an image is received and converted into pixel data. In at least one embodiment, the pixel data includes pixels represented by N bits, and the N bits may represent a drop size for the pixel and a union of the N bits may represent a nozzle status. A print head may be controlled based on the pixel data, and the print head may include nozzles that are each adapted to deposit at least one drop size quantity of a fluid on a substrate.

17 Claims, 6 Drawing Sheets

| HEAD 302 | NOZZLE 304 | DROP SIZE 306 | PULSE VOLTAGE 308 | PULSE WIDTH 310 |
|---|---|---|---|---|
| 1 | 3 | $D_5$ | 108.6V | 6600ns |
| 1 | 3 | $D_6$ | 126.6V | 7300ns |
| 1 | 3 | $D_7$ | 140.0V | 8000ns |
| 1 | 4 | $D_1$ | 60V | 4000ns |
| 1 | 4 | $D_2$ | 73.3V | 4700ns |

300

U.S. PATENT DOCUMENTS

| | | | |
|---|---|---|---|
| 5,714,195 A | 2/1998 | Shiba et al. |
| 5,716,739 A | 2/1998 | Kashiwazaki et al. |
| 5,716,740 A | 2/1998 | Shiba et al. |
| 5,726,724 A | 3/1998 | Shirota et al. |
| 5,748,266 A | 5/1998 | Kodate |
| 5,811,209 A | 9/1998 | Eida et al. |
| 5,817,441 A | 10/1998 | Iwata et al. |
| 5,831,704 A | 11/1998 | Yamada et al. |
| 5,847,735 A | 12/1998 | Betschon |
| 5,880,799 A | 3/1999 | Inoue et al. |
| 5,895,692 A | 4/1999 | Shirasaki et al. |
| 5,916,713 A | 6/1999 | Ochiai et al. |
| 5,916,735 A | 6/1999 | Nakashima et al. |
| 5,922,401 A | 7/1999 | Kashiwazaki et al. |
| 5,948,576 A | 9/1999 | Shirota et al. |
| 5,948,577 A | 9/1999 | Nakazawa et al. |
| 5,956,063 A | 9/1999 | Yokoi et al. |
| 5,962,581 A | 10/1999 | Hayase et al. |
| 5,968,688 A | 10/1999 | Masuda et al. |
| 5,969,780 A | 10/1999 | Matsumoto et al. |
| 5,984,470 A | 11/1999 | Sakino et al. |
| 5,989,757 A | 11/1999 | Satoi |
| 6,013,415 A | 1/2000 | Sakurai et al. |
| 6,025,898 A | 2/2000 | Kashiwazaki et al. |
| 6,025,899 A | 2/2000 | Fukunaga et al. |
| 6,042,974 A | 3/2000 | Iwata et al. |
| 6,063,527 A | 5/2000 | Nishikawa et al. |
| 6,066,357 A | 5/2000 | Tang et al. |
| 6,071,989 A | 6/2000 | Sieber et al. |
| 6,078,377 A | 6/2000 | Tomono et al. |
| 6,087,196 A | 7/2000 | Sturm et al. |
| 6,106,093 A * | 8/2000 | Nagoshi et al. ............... 347/15 |
| 6,134,059 A | 10/2000 | Shirota et al. |
| 6,140,988 A | 10/2000 | Yamada |
| 6,142,604 A | 11/2000 | Kanda et al. |
| 6,145,981 A | 11/2000 | Akahira et al. |
| 6,149,257 A | 11/2000 | Yanaka et al. |
| 6,153,711 A | 11/2000 | Towns et al. |
| 6,154,227 A | 11/2000 | Lund |
| 6,158,858 A | 12/2000 | Fujiike et al. |
| 6,162,569 A | 12/2000 | Nakashima et al. |
| 6,196,663 B1 | 3/2001 | Wetchler et al. |
| 6,211,347 B1 | 4/2001 | Sieber et al. |
| 6,224,205 B1 | 5/2001 | Akahira et al. |
| 6,226,067 B1 | 5/2001 | Nishiguchi et al. |
| 6,228,435 B1 | 5/2001 | Yoshikawa et al. |
| 6,234,626 B1 | 5/2001 | Axtell et al. |
| 6,242,139 B1 | 6/2001 | Hedrick et al. |
| 6,244,702 B1 | 6/2001 | Sakino et al. |
| 6,264,322 B1 | 7/2001 | Axtell et al. |
| 6,270,930 B1 | 8/2001 | Okabe |
| 6,271,902 B1 | 8/2001 | Ogura et al. |
| 6,277,529 B1 | 8/2001 | Marumoto et al. |
| 6,281,960 B1 | 8/2001 | Kishimoto et al. |
| 6,312,771 B1 | 11/2001 | Kashiwazaki et al. |
| 6,322,936 B1 | 11/2001 | Nishikawa et al. |
| 6,323,921 B1 | 11/2001 | Kurauchi et al. |
| 6,331,384 B1 | 12/2001 | Satoi |
| 6,341,840 B1 | 1/2002 | Van Doorn et al. |
| 6,344,301 B1 | 2/2002 | Akutsu et al. |
| 6,356,357 B1 | 3/2002 | Anderson et al. |
| 6,358,602 B1 | 3/2002 | Horiuchi et al. |
| 6,367,908 B1 | 4/2002 | Serra et al. |
| 6,384,528 B1 | 5/2002 | Friend et al. |
| 6,384,529 B2 | 5/2002 | Tang et al. |
| 6,386,675 B2 | 5/2002 | Wilson et al. |
| 6,392,728 B2 | 5/2002 | Tanaka et al. |
| 6,392,729 B1 | 5/2002 | Izumi et al. |
| 6,399,257 B1 | 6/2002 | Shirota et al. |
| 6,417,908 B2 | 7/2002 | Nishiguchi et al. |
| 6,424,393 B1 | 7/2002 | Hirata et al. |
| 6,424,397 B1 | 7/2002 | Kuo |
| 6,426,166 B2 | 7/2002 | Nishikawa et al. |
| 6,428,135 B1 | 8/2002 | Lubinsky et al. |
| 6,428,151 B1 | 8/2002 | Yi et al. |
| 6,429,601 B1 | 8/2002 | Friend et al. |
| 6,429,916 B1 | 8/2002 | Nakata et al. |
| 6,433,852 B1 | 8/2002 | Sonoda et al. |
| 6,450,635 B1 | 9/2002 | Okabe et al. |
| 6,455,208 B1 | 9/2002 | Yamashiki et al. |
| 6,462,798 B1 | 10/2002 | Kim et al. |
| 6,464,329 B1 | 10/2002 | Koitabashi et al. |
| 6,464,331 B1 | 10/2002 | Van Doorn et al. |
| 6,468,702 B1 | 10/2002 | Yi et al. |
| 6,471,352 B2 * | 10/2002 | Akahira ...................... 347/106 |
| 6,475,271 B2 | 11/2002 | Lin |
| 6,476,888 B2 | 11/2002 | Yamanashi |
| 6,480,253 B1 | 11/2002 | Shigeta et al. |
| 6,498,049 B1 | 12/2002 | Friend et al. |
| 6,508,533 B2 | 1/2003 | Tsujimoto et al. |
| 6,518,700 B1 | 2/2003 | Friend et al. |
| 6,557,984 B2 | 5/2003 | Tanaka et al. |
| 6,569,706 B2 | 5/2003 | Pakbaz et al. |
| 6,580,212 B2 | 6/2003 | Friend |
| 6,627,364 B2 | 9/2003 | Kiguchi et al. |
| 6,630,274 B1 | 10/2003 | Kiguchi et al. |
| 6,667,795 B2 | 12/2003 | Shigemura |
| 6,686,104 B1 | 2/2004 | Shiba et al. |
| 6,692,983 B1 | 2/2004 | Chen et al. |
| 6,693,611 B1 | 2/2004 | Burroughes |
| 6,695,905 B2 | 2/2004 | Rozumek et al. |
| 6,698,866 B2 | 3/2004 | Ward et al. |
| 6,705,694 B1 | 3/2004 | Barbour et al. |
| 6,738,113 B2 | 5/2004 | Yu et al. |
| 6,762,234 B2 | 7/2004 | Grizzi |
| 2001/0012596 A1 | 8/2001 | Kunimoto et al. |
| 2002/0054197 A1 | 5/2002 | Okada et al. |
| 2002/0081376 A1 | 6/2002 | Yonehara |
| 2002/0128515 A1 | 9/2002 | Ishida et al. |
| 2003/0025446 A1 | 2/2003 | Lin et al. |
| 2003/0030715 A1 | 2/2003 | Cheng et al. |
| 2003/0039803 A1 | 2/2003 | Burroughes |
| 2003/0076454 A1 | 4/2003 | Burroughes |
| 2003/0117455 A1 | 6/2003 | Bruch et al. |
| 2003/0118921 A1 | 6/2003 | Chen et al. |
| 2003/0171059 A1 | 9/2003 | Kawase et al. |
| 2003/0189604 A1 | 10/2003 | Bae et al. |
| 2003/0218645 A1 | 11/2003 | Dings et al. |
| 2003/0222927 A1 | 12/2003 | Koyama |
| 2003/0224621 A1 | 12/2003 | Ostergard et al. |
| 2004/0008243 A1 | 1/2004 | Sekiya |
| 2004/0018305 A1 | 1/2004 | Pagano et al. |
| 2004/0023567 A1 | 2/2004 | Koyama et al. |
| 2004/0041155 A1 | 3/2004 | Grzzi et al. |
| 2004/0075383 A1 | 4/2004 | Endo et al. |
| 2004/0075789 A1 | 4/2004 | Wang |
| 2004/0086631 A1 | 5/2004 | Han et al. |
| 2004/0094768 A1 | 5/2004 | Yu et al. |
| 2004/0097101 A1 | 5/2004 | Kwong et al. |
| 2004/0097699 A1 | 5/2004 | Holmes et al. |
| 2004/0109051 A1 | 6/2004 | Bright et al. |
| 2004/0125181 A1 | 7/2004 | Nakamura |

FOREIGN PATENT DOCUMENTS

| | | |
|---|---|---|
| EP | 1 106 360 A1 | 6/2001 |
| JP | 59-075205 | 4/1984 |
| JP | 61-245106 | 10/1986 |
| JP | 63-235901 | 9/1988 |
| JP | 63-294503 | 12/1988 |
| JP | 01-277802 | 11/1989 |
| JP | 02-173703 | 7/1990 |
| JP | 02-173704 | 7/1990 |
| JP | 07-198924 | 8/1995 |

| | | | | | |
|---|---|---|---|---|---|
| JP | 08-160219 | 6/1996 | JP | 2003-303544 | 10/2003 |
| JP | 10-039130 | 2/1998 | JP | 2004-077681 | 3/2004 |
| JP | 10-073813 | 3/1998 | WO | WO 02/14076 A1 | 2/2002 |
| JP | 2002-277622 | 9/2002 | | | |

* cited by examiner

| PIXEL DATA 202 | NOZZLE STATUS 204 | NOMINAL PULSE VOLTAGE 206 | DROP SIZE 208 |
|---|---|---|---|
| 000 | OFF | 0 | - |
| 001 | ON | $V_1$ | $D_1$ |
| 010 | ON | $V_2$ | $D_2$ |
| 011 | ON | $V_3$ | $D_3$ |
| 100 | ON | $V_4$ | $D_4$ |
| 101 | ON | $V_5$ | $D_5$ |
| 110 | ON | $V_6$ | $D_6$ |
| 111 | ON | $V_7$ | $D_7$ |

| HEAD 302 | NOZZLE 304 | DROP SIZE 306 | PULSE VOLTAGE 308 | PULSE WIDTH 310 |
|---|---|---|---|---|
| 1 | 3 | $D_5$ | 108.6V | 6600ns |
| 1 | 3 | $D_6$ | 126.6V | 7300ns |
| 1 | 3 | $D_7$ | 140.0V | 8000ns |
| 1 | 4 | $D_1$ | 60V | 4000ns |
| 1 | 4 | $D_2$ | 73.3V | 4700ns |

METHODS AND APPARATUS FOR PRECISION CONTROL OF PRINT HEAD ASSEMBLIES

CROSS REFERENCE TO RELATED APPLICATIONS

The present application is related to the following commonly-assigned, co-pending U.S. patent application, which is hereby incorporated herein by reference in its entirety for all purposes:

U.S. Provisional Patent Application Ser. No. 60/625,550, filed Nov. 4, 2004 and entitled "APPARATUS AND METHODS FOR FORMING COLOR FILTERS IN A FLAT PANEL DISPLAY BY USING INKJETTING."

FIELD OF THE INVENTION

The present invention relates generally to systems for printing, and is more particularly concerned with precision control of print head assemblies.

BACKGROUND OF THE INVENTION

The flat panel display industry has been attempting to employ inkjet printing to manufacture display devices, in particular, color filters. One problem with effective employment of inkjet printing is that it is difficult to inkjet ink or other material accurately and precisely on a substrate while having high throughput. Accordingly, there is a need for improved methods and apparatus for efficiently printing using inkjet heads on a substrate.

SUMMARY OF THE INVENTION

In a first aspect of the present invention, a method is provided wherein data representative of an image is received. The image may be of a filter for a display, e.g., a RGB-filter (red, green, blue-filter) for a flat panel display. The data may be converted into pixel data including drop size information, and the drop size information may specify a quantity of fluid per drop. A print head that includes a plurality of nozzles may be controlled based on the pixel data, and the nozzles may be adapted to each deposit at least one drop size quantity of a fluid on a substrate.

In a second aspect of the present invention, a method is provided that includes determining a desired volume of ink per unit area to be deposited within a first sub-pixel well having a predefined area. Based on data representative of an image of a filter that includes a second sub-pixel well of a different size than the first sub-pixel well, ink is deposited within the second sub-pixel well using a drop size and a number of drops that most closely match the determined desired volume of ink per unit area.

In a third aspect of the present invention, a method is provided wherein a digital image representative of a display filter may be generated. The digital image may include a representation of filter pixels. Image pixel data, including a drop size and nozzle status for each of the filter pixels, may be determined. A print head may be controlled based on the image pixel data.

In a fourth aspect of the present invention, an apparatus is provided that includes a controller with a driver. A print head may be coupled to the controller and adapted to be controlled by the driver based on pixel data. A memory may be coupled to the controller and adapted to store data representative of an image converted into pixel data. The pixel data may include pixels, each one represented by N bits. The N bits may represent a drop size and the union of the N bits may represent a nozzle status.

Other features and aspects of the present invention will become more fully apparent from the following detailed description of exemplary embodiments, the appended claims and the accompanying drawings.

DETAILED DESCRIPTION

Inkjet printers frequently make use of one or more inkjet print heads (or heads) mounted within a carriage that is moved back and forth across a substrate, such as glass for a flat panel display. In some printers, the substrate is additionally or alternatively moved relative to the heads on a moving table top called a stage. As the substrate travels relative to the heads, a control system activates individual nozzles within the heads to deposit or eject ink (or other fluid) droplets onto the substrate to form images. The images to be printed are represented as electronic images stored in a memory of the control system. In other words, pixels of an electronic image are used to represent drop locations on the substrate.

Activating a nozzle may include sending a fire pulse signal or pulse voltage to the individual nozzle to cause an ejection mechanism to dispense a quantity of ink. In some heads, the pulse voltage is used to trigger, for example, a piezoelectric element that pushes ink out of the nozzle. In other heads the pulse voltage causes a laser to irradiate a membrane that, in response to the laser light, pushes ink out of the nozzle. Other methods may be employed. Ink or another fluid is provided to the heads by a supply of ink that is either carried by the carriage or mounted to the printing system so as not to move with the carriage. For the case where the ink supply is not carried with the carriage, the ink supply can be intermittently or continuously connected to the heads for replenishing the heads.

Existing conventional print heads typically eject a fixed amount of ink per drop. A preferred fixed size of a drop is usually determined at the time of manufacturing. Any adjustments to the amount of ink to be ejected per drop that may be made by a user or printer control circuit are typically made only during a configuration process and are only done to maintain a consistent drop size. The inventors of the present invention have determined that to precisely and efficiently print small patterns of different geometric shapes, it would be beneficial to use different ink drop sizes during printing.

However, systems and methods are needed to allow the dynamic re-sizing of drops while printing without significantly affecting ink jetting throughput or printing performance.

The present invention provides methods and apparatus for controlling the quantity of fluid output (e.g., drop size) by individual nozzles of a print head to a very high precision at a frequency equal to the frequency at which fluid is normally dispensed. This is achieved by mapping fluid quantity control information into the data that represents the image to be printed. In other words, drop size information is encoded into the image data and with minimal, if any, impact on throughput performance, very small images may be printed using variable drop sizes. In addition, this "pixel data" that includes the drop size data within the image data may also include nozzle status data that indicates an on/off status of individual nozzles. The pixel data is used to generate variable amplitude fire pulse voltage signals that are used to trigger the nozzles of print heads to dispense drop sizes that correspond to the amplitudes. In one or more embodiments, a number of bits may be added to or associated with the representation of each pixel of the image to be printed. These bits represent a particular desired drop size to be used when printing the particular pixel. A database that correlates desired drop size and required fire pulse amplitude is used to generate the fire pulse voltage signal with the required amplitude to cause the desired drop size to be dispensed. In some embodiments, the width of the fire pulse voltage signal may be additionally and/or alternatively be varied to control the amount of fluid dispensed.

In the case of printing a color filter for a display that includes a number of predefined wells that will represent display pixels, the pixels of the electronic image may indicate the position where one or more drops of fluid are to be deposited to fill the display pixel well. The wells may be laid out on the substrate before printing using a process of coating, masking and etching.

The use of variable drop sizes in inkjet printing of color filters may be advantageous for a number of reasons. In general, the smaller the drop size, the potentially more precise a printer may be. For example, a small drop size print head can print a narrower line than a large drop size print head. However, the use of a small drop size reduces that rate at which ink may be deposited and thus, the overall throughput of the printer may consequently be reduced by exclusively using a small drop size. By varying the drop size according to the present invention, overall throughput may be maintained or improved by using larger drop sizes when a relatively large amount of ink is desired and using smaller drop sizes when a relatively higher level of precision is desired.

In addition, different types and colors of inks may have different properties both in terms of coverage and the rate at which the different inks jet from a print head. In other words, for example, less blue ink may be required than yellow ink to cover a given area, or type A red ink may jet at a first drop size for a given firing pulse voltage while type B red ink may jet at a second, different drop size in response the same firing pulse voltage. Thus, the use of variable drop sizes may allow a printer to accommodate inks with different properties as well as help the printer maintain higher throughput with higher precision printing.

Figure 1A:
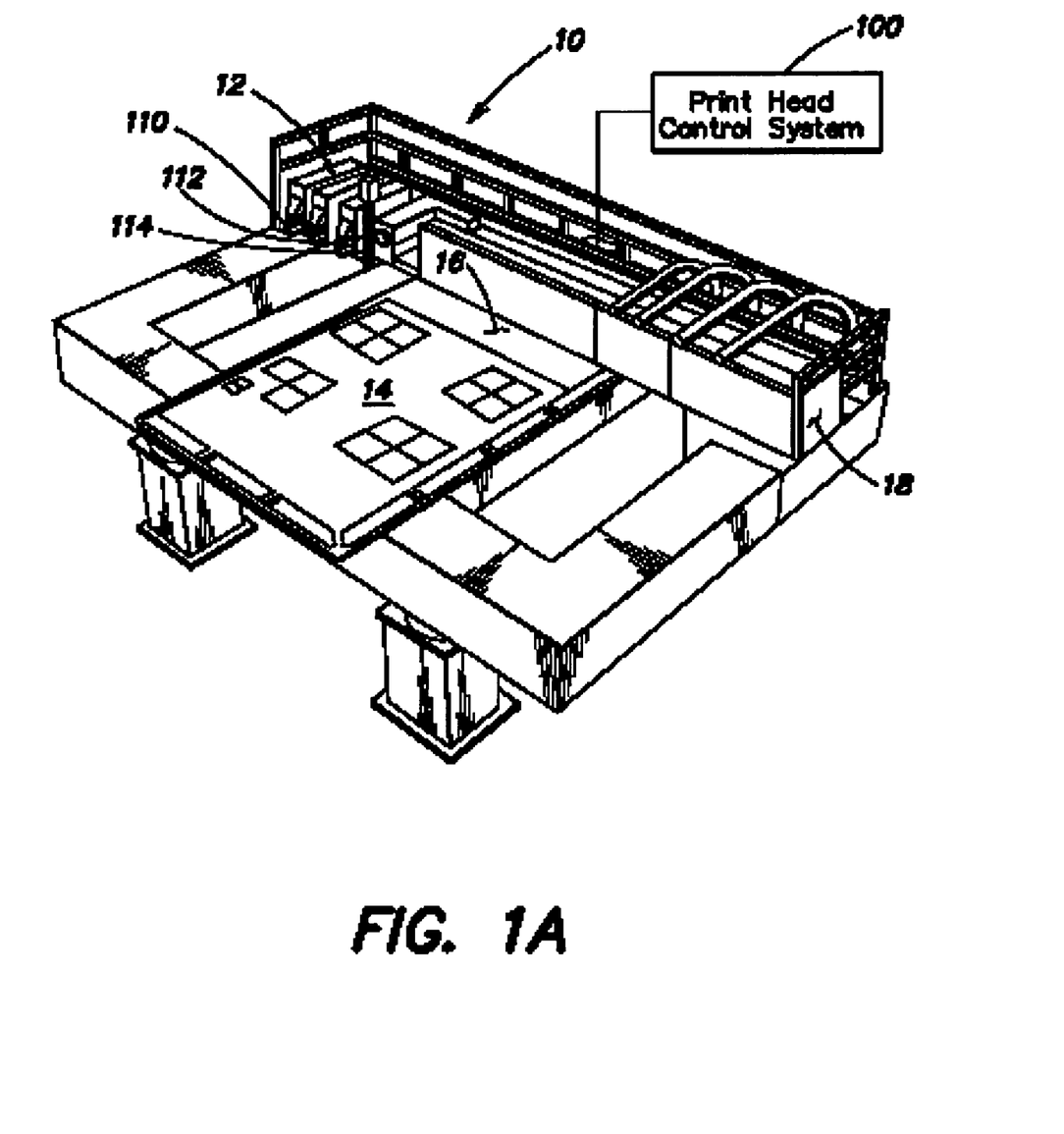
FIG. 1A is a perspective drawing of an example inkjet printer according to some embodiments of the present invention.

FIG. 1A is a perspective drawing of an example inkjet printer 10 suitable for use with embodiments of the present invention. One or more inkjet devices 12 may each include one or more print heads 110, 112, 114 for dispensing ink onto sub-pixels of a display object contained on a substrate 14 on a substrate support 16. The inkjet devices 12 may be suspended over and moved across the substrate 14 by an inkjet head support 18 while ink is dispensed under the direction of a print head control system 100 included as part of, or coupled to, the inkjet printer 10.

Figure 1B:
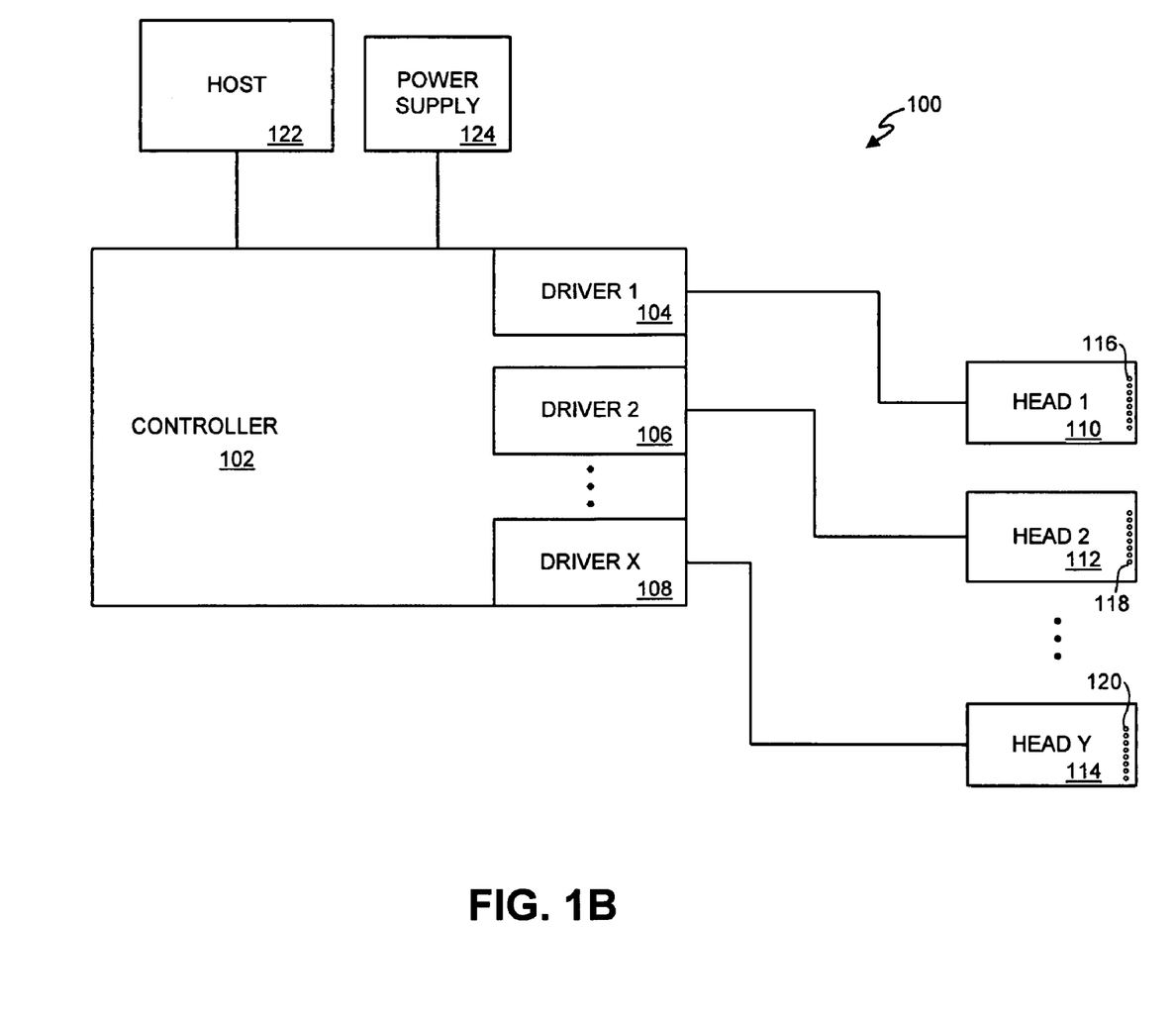
FIG. 1B is a schematic illustration of a print head control system according to some embodiments of the present invention.

Turning to FIG. 1B, a schematic illustration of an example embodiment of a print head control system 100 is provided. A print head control system 100 may include a controller 102 that includes a processor and/or sequencer (not pictured) and one or more memories (not pictured). The controller 102 may also include one or more drivers 104, 106, 108 that may each include circuitry to transmit data and control signals to one or more print heads 110, 112, 114. The print heads 110, 112, 114, may include one or more nozzles 116, 118, 120. The controller 102 may additionally be coupled to a host computer 122 for receiving image and other data and to a power supply 124 for generating firing pulse signals.

The controller 102 may be implemented using a field programmable gate array (FPGA) or other similar device. In some embodiments, discrete components may be used to implement the controller 102. The controller 102 may be adapted to control and/or monitor the operation of the print head control system 100 and/or one or more of various electrical and mechanical components, devices, and/or systems of the print head control system 100 which are described herein. In some embodiments, the controller 102 may be any suitable computer or computer system, or may include any number of computers or computer systems.

In some embodiments, the controller 102 may be or may include any components or devices which are typically used by, or used in connection with, a computer or computer system. Although not explicitly pictured in FIG. 1B, the controller 102 may include a central processing unit(s), a read only memory (ROM) device, a random access memory (RAM) device, an input device such as a key board and/or a mouse or other pointing device, an output device such as a printer or other device via which data and/or information may be obtained, a display device such as a monitor for displaying information to a user or operator, a transmitter and/or a receiver such as a LAN adapter or communications port for facilitating communication with other system components and/or in a network environment, one or more databases for storing any appropriate data and/or information, one or more programs or sets of instructions for executing methods of the present invention, and/or any other computer components or systems, including any peripheral devices.

According to some embodiments of the present invention, instructions of a program may be read into a memory of the controller 102 from another medium, such as from a ROM device to a RAM device. Execution of sequences of the instructions in the program may causes the controller 102 to perform the process steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software.

As indicated above, the controller 102 may generate, receive, and/or store databases including data related to images to be printed, head and nozzle calibration information, and/or the relationship between pulse voltage and drop size. Example embodiments of such databases are described in detail below with respect to FIGS. 2 and 3. As will be understood by those skilled in the art, the schematic illustrations and accompanying descriptions of the sample databases presented herein are exemplary arrangements for stored representations of information. Any number of other arrangements may be employed besides those suggested by the tables shown. For example, even though two separate databases are illustrated, the invention could be practiced effectively using one, three, four, or more functionally equivalent databases. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and likewise, object methods or behaviors can be used to implement the processes of the present invention. Two of these processes are described below with respect to FIGS. 4 and 5.

The drivers 104, 106, 108 may be embodied as a portion or portions of the controller's 102 logic as represented in FIG. 1B. In alternative and/or additional embodiments, the drivers 104, 106, 108 may be embodied as separate circuits coupled to, but independent of, the controller 102. As pictured, each of the drivers 104, 106, 108 may be used to drive a corresponding print head 110, 112, 114. In some embodiments, one driver 104 may be used to driver all the print heads 110, 112, 114. The drivers 104, 106, 108 may be used to send data and clock signals to the corresponding print heads 110, 112, 114. In addition, the drivers 104, 106, 108 may be used to send firing pulse voltage signals to the corresponding print heads 110, 112, 114 to trigger individual nozzles 116, 118, 120 of the print heads 110, 112, 114 to deposit specific quantities of ink or other fluid onto a substrate.

The drivers 104, 106, 108 may each be coupled directly to the power supply 124 so as to be able to generate a relatively high voltage firing pulse to trigger the nozzles 116, 118, 120 to "jet" ink. In some embodiments, the power supply 124 may be a high voltage negative power supply adapted to generate signals having an amplitude from approximately 60 to 140 volts or more. Other voltages may be used. The drivers 104, 106, 108 may, under the control of the controller 102, send firing pulse voltage signals with specific amplitudes and durations so as to cause the nozzles 116, 118, 120 of the print heads 110, 112, 114 to dispense ink (or other fluid) drops of specific drop sizes.

The print heads 110, 112, 114, may each include any number of nozzles 116, 118, 120. In some embodiments, each print head 110, 112, 114 may include one hundred twenty eight nozzles 116, 118, 120 that may each be independently fired. An example of a commercially available print head suitable for used with the present invention is the model SX-128, 128-Channel Jetting Assembly manufactured by Spectra, Inc. of Lebanon, N.H. This particular jetting assembly includes two electrically independent piezoelectric slices, each with sixty-four addressable channels, which are combined to provide a total of 128 jets. The nozzles 116, 118, 120 are arranged in a single line, at a 0.020" distance between nozzles 116, 118, 120. The nozzles 116, 118, 120 are designed to dispense drops from 10 to 12 picoliters but may be adapted to dispense a broader range of drop sizes, for example, 10 to 30 picoliters. Other print heads with differently sized nozzles may also be used.

As indicated above, it should be noted that although the example embodiment depicted in FIG. 1B may include particular databases stored in memory, other database arrangements may be used which would still be in keeping with the spirit and scope of the present invention. In other words, the present invention could be implemented using any number of different database files or data structures, as opposed to the two depicted in FIGS. 2 and 3. Further, the individual database files could be stored on different devices (e.g. located on different storage devices in different physical locations, such as on the host 122). Likewise, a program may also be located remotely from the controller 102 and/or on the host 122. As indicated above, a program may include instructions for retrieving, manipulating, and storing data in the databases as may be useful in performing the methods of the invention as will be further described below.

Figure 2:
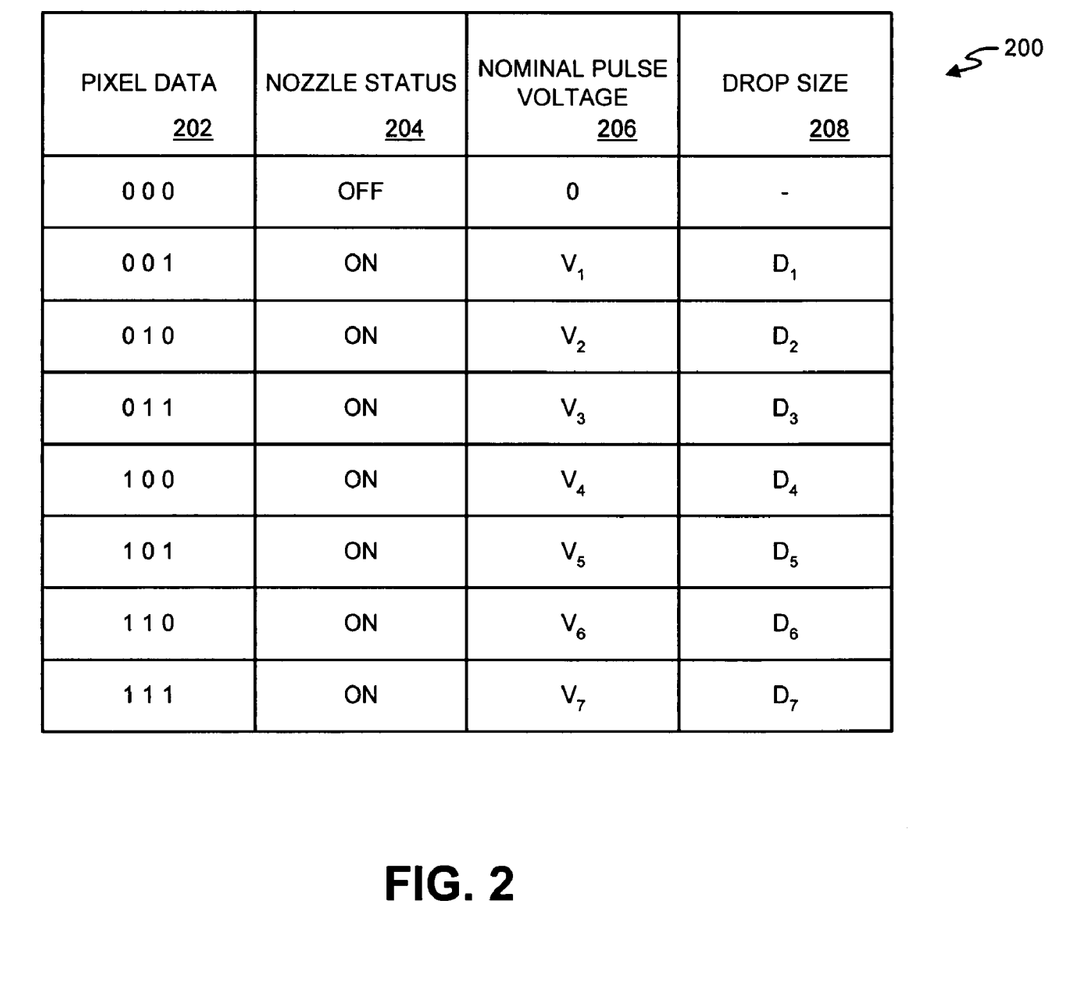
FIG. 2 is a table representative of an example embodiment of a pixel decode database according to some embodiments of the present invention.

Turning to FIG. 2, an example embodiment of a pixel decode database 200 is provided in tabular format. A pixel decode database 200 according to some embodiments of the present invention may be used to relate pixel data with one or both nozzle status and drop size. In other words, this database 200 indicates which bit pattern corresponds to which drop size. The number of entries (or rows) of a pixel decode database 200 may correspond to the number of bits (N) chosen to represent the possible drop sizes that the print head control system 100 may dispense from a nozzle. In other words, using N bits to represent $2^N-1$ possible drop sizes, a corresponding pixel decode database 200 would include $2^N$ entries. The more resolution desired, the higher the value of N that may be used. In the example embodiment depicted in FIG. 2, a value of N equal to three is used and thus, there are eight entries in the sample pixel decode database 200. One entry may be used to represent an "OFF" nozzle status and the remaining entries may be used to represent the $2^N-1$ possible drop sizes.

The particular representation of a pixel decode database 200 depicted in FIG. 2 includes four fields for each of the entries or records. The fields may include: (i) a pixel data field 202 that stores a representation uniquely identifying the bit value that is defined by the entry; (ii) an nozzle status field 204 that stores a representation indicating whether a nozzle is to dispense a drop or not; (iii) a nominal pulse voltage field 206 that stores a representation of an uncorrected fire pulse signal amplitude that nominally corresponds with the drop size referenced by the entry; and (iv) a drop size field 208 that stores a representation of a volume or mass of a quantity of ink (or fluid) to be dispensed.

Drop size may be expressed in terms of actual units of volume (e.g., picoliters) or drop size may merely be indicated in relative terms (e.g., where N=2 and thus, there are three possible drop sizes, drop size may be specified merely using "small," "medium," or "large"). In some embodiments, the actual $2^N-1$ drop sizes may be selected to evenly cover the range of possible drop sizes (i.e., a uniform distribution). In additional and/or alternative embodiments, drop sizes may be selected to satisfy particular printing requirements. For example, where greater resolution is required for smaller drop sizes versus larger drop sizes, a geometric distribution of drop sizes over the range of possible drop sizes may be selected.

Figure 3:
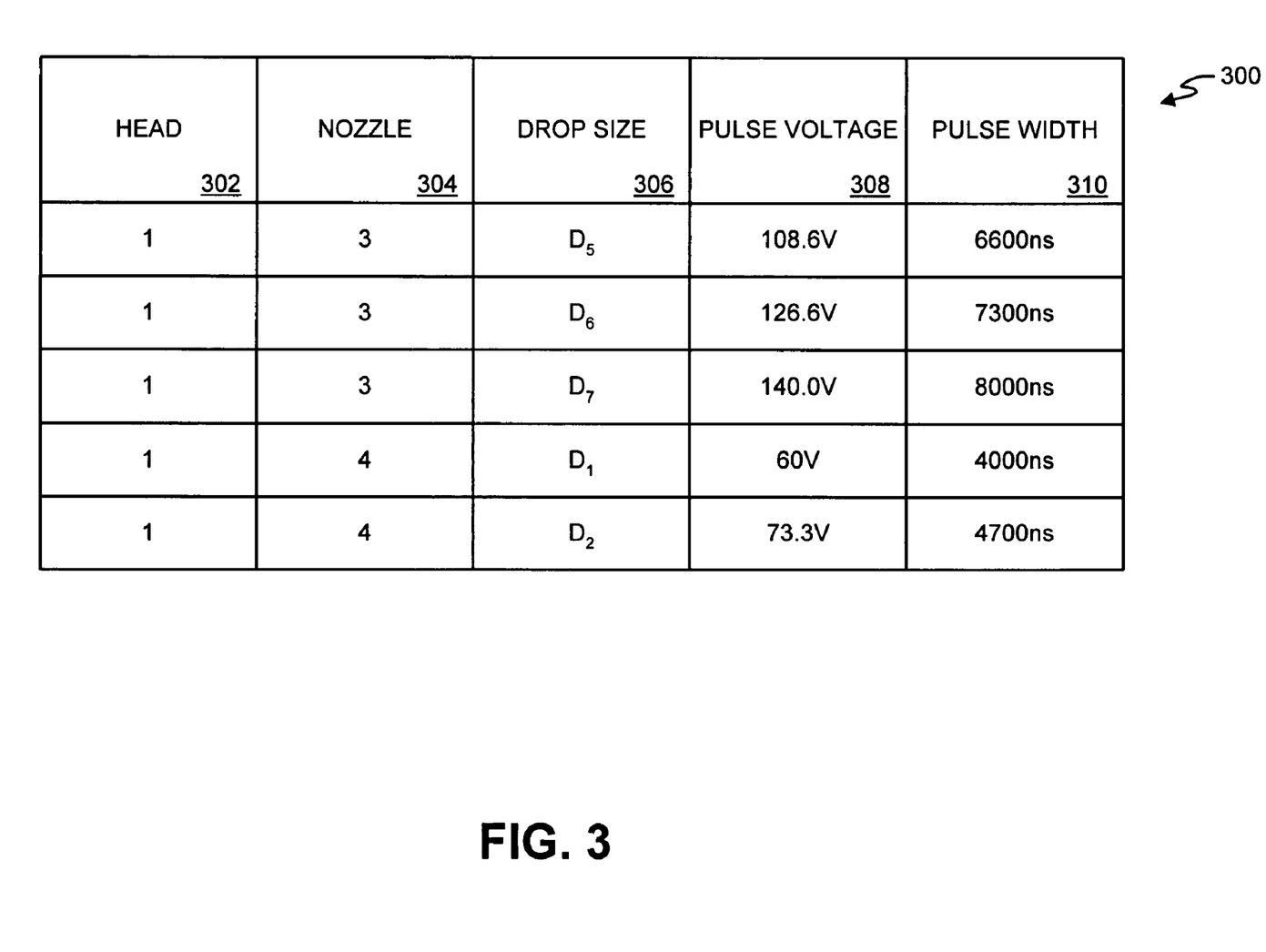
FIG. 3 is a table representative of an example embodiment of a fire pulse database according to some embodiments of the present invention.

Turning to FIG. 3, an example embodiment of a fire pulse database 300 is provided in tabular format. A fire pulse database 300 according to some embodiments of the present invention may be used to store the required pulse voltage necessary to dispense a desired drop size from a particular nozzle (for each drop size from each nozzle of each head). Thus, for a print head control system 100 that uses N bits of pixel data, a fire pulse database 300 would include $$(2^N-1)*(\text{number of nozzles})*(\text{number of heads})$$

entries where the $(2^N-1)$ term represents the number of drop sizes. The particular example database 300 of FIG. 3 only depicts five sample entries, but in a three head, 128 nozzles per head, and N=3 print head control system 100, such a database 300 would include 2,688 entries [$(2^3-1)*128*3=2,688$].

The particular representation of a fire pulse database 300 depicted in FIG. 3 includes five fields for each of the entries or records. The fields may include: (i) a print head identification field 302 that stores a representation uniquely identifying the relevant print head, (ii) a nozzle identification field 304 that stores a representation uniquely identifying the relevant nozzle of the specified head 302, (iii) a drop size field 306 that stores a representation uniquely identifying the relevant drop size for the specified nozzle 304 on the specified head 302, (iv) a pulse voltage field 308 that stores a representation of the amplitude of a firing pulse signal required to cause the specified nozzle 304 on the specified head 302 to dispense the specified drop size 306, and (v) an optional pulse width field 310 that may store a representation of the width of a firing pulse signal required to cause the specified nozzle 304 on the specified head 302 to dispense the specified drop size 306. In some embodiments, the pulse width 310 may be held constant.

In additional and/or alternative embodiments, the pulse width 310 may be varied to provide an additional means to more accurately control adjustments to drop size. In other words, pulse width 310 may be used to fine tune a nozzles output to more accurately and reliably dispense a particular drop size. As with pulse voltage 308 (amplitude), the precise effect of varying pulse width 310 may be experimentally determined or, in some embodiments, it may be specified by a print head manufacturer or an equation derived based upon print head characteristics. In embodiments where the pulse voltage 308 is held constant, the pulse width 310 may be the exclusive parameter used to control drop size. The example values depicted in FIG. 3 are merely illustrative of how pulse width 310 may be varied along with pulse voltage 308 to generate a desired drop size. However, as indicated above, in some embodiments, it may not be necessary at all to vary pulse width 310. Note that in embodiments that generally use a constant pulse width 310 but sometimes vary pulse width 310, an additional bit may be encoded into the pixel data to indicate to the print head control system 100 that variable pulse width 310 information is stored in the fire pulse database 300. Likewise, in some embodiments, an additional bit (or bits) may be encoded into the pixel data to indicate whether the pulse voltage 308 and/or the pulse width 310 information should be employed to generate the firing pulse signal.

In operation, a print head control system 100 according to the present invention may employ a controller 102 to receive, from a host 122, an image representative of a color filter to be printed on a substrate. The image may be in the form of a digital file (e.g., a bit map) that the controller 102 stores in local memory. The digital file may include image data that describes each pixel to be printed by the print head control system 100. The controller 102 may generate "pixel data" from the image data by determining a drop size for each pixel represented by the image data. As indicated above, the pixel data generated by the controller 102 may include the image data with N bits of additional information appended to, or otherwise associated with, each representation of a pixel. The N bits may specify the drop size for the pixel and, in some embodiments, the nozzle status for the pixel. A database 200 such as depicted in FIG. 2 may be used to encode the drop size into the N bits.

Once the pixel data has been generated for a first pixel, printing may commence. Alternatively, some or all pixel data for all pixels may be generated prior to printing. Additional pixel data may be generated in parallel with printing. Using a database 300 such as depicted in FIG. 3, a pulse voltage value and width value may be retrieved for each value of pixel data (e.g., image data for a given pixel including a head/nozzle identifier, a drop size, and a nozzle status). Based in the retrieved pulse voltage value and width value, a firing pulse signal with the specified amplitude and width for the respective head/nozzle may be generated by the appropriate driver 104, 106, 108 and sent to the appropriate nozzle on the appropriate head 110, 112, 114 to trigger the dispensing of fluid.

The system 100 discussed above, including the hardware components and the databases, are useful to perform the methods of the invention. However, it should be understood that not all of the above described components and databases are necessary to perform any of the present invention's methods. In fact, in some embodiments, none of the above described system 100 is required to practice the present invention's methods. The system 100 described above is merely an example of a system that would be useful in practicing the invention's methods.

Figure 4:
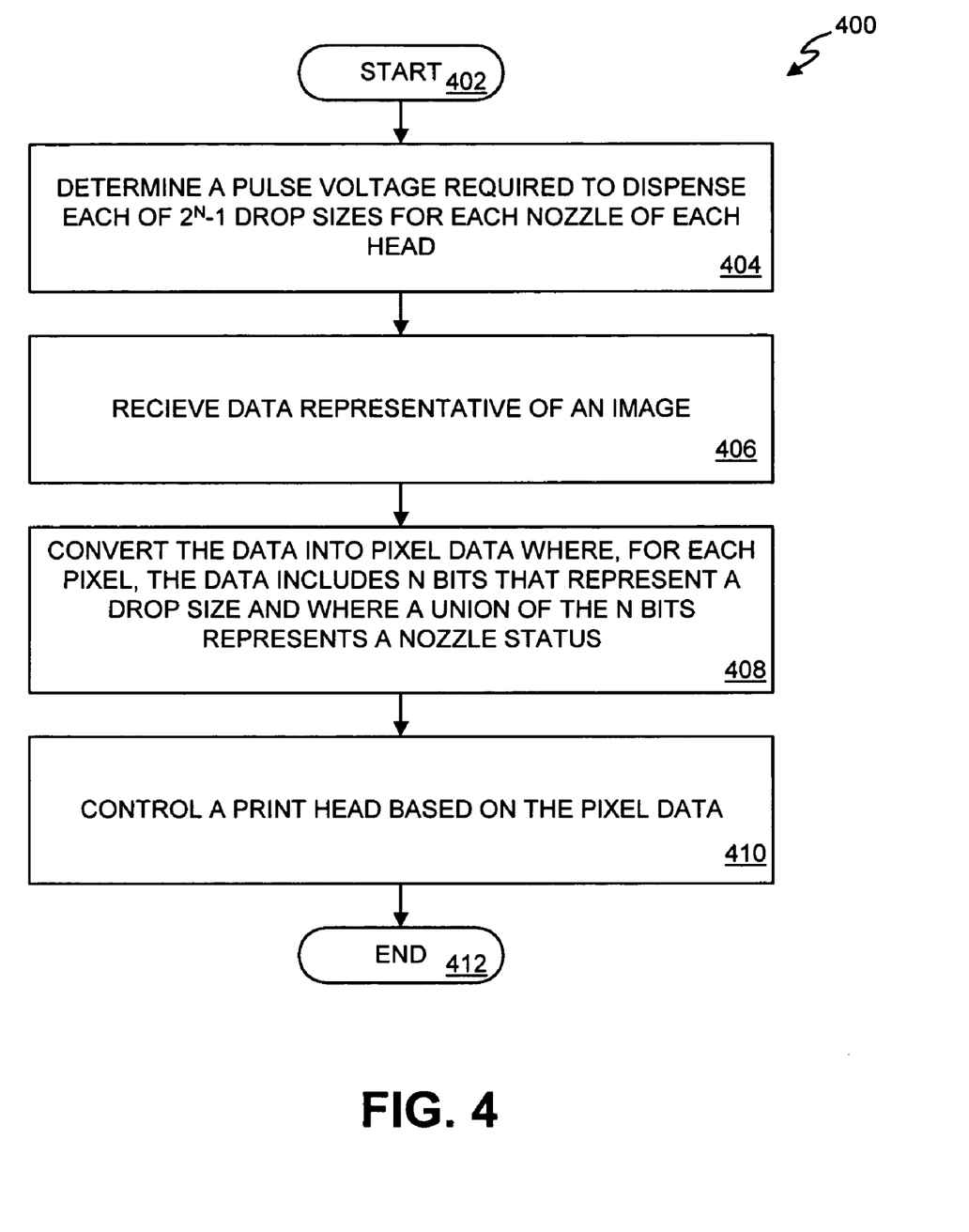
FIG. 4 is a flowchart illustrating an example embodiment of a method according to some embodiments of the present invention.
Figure 5:
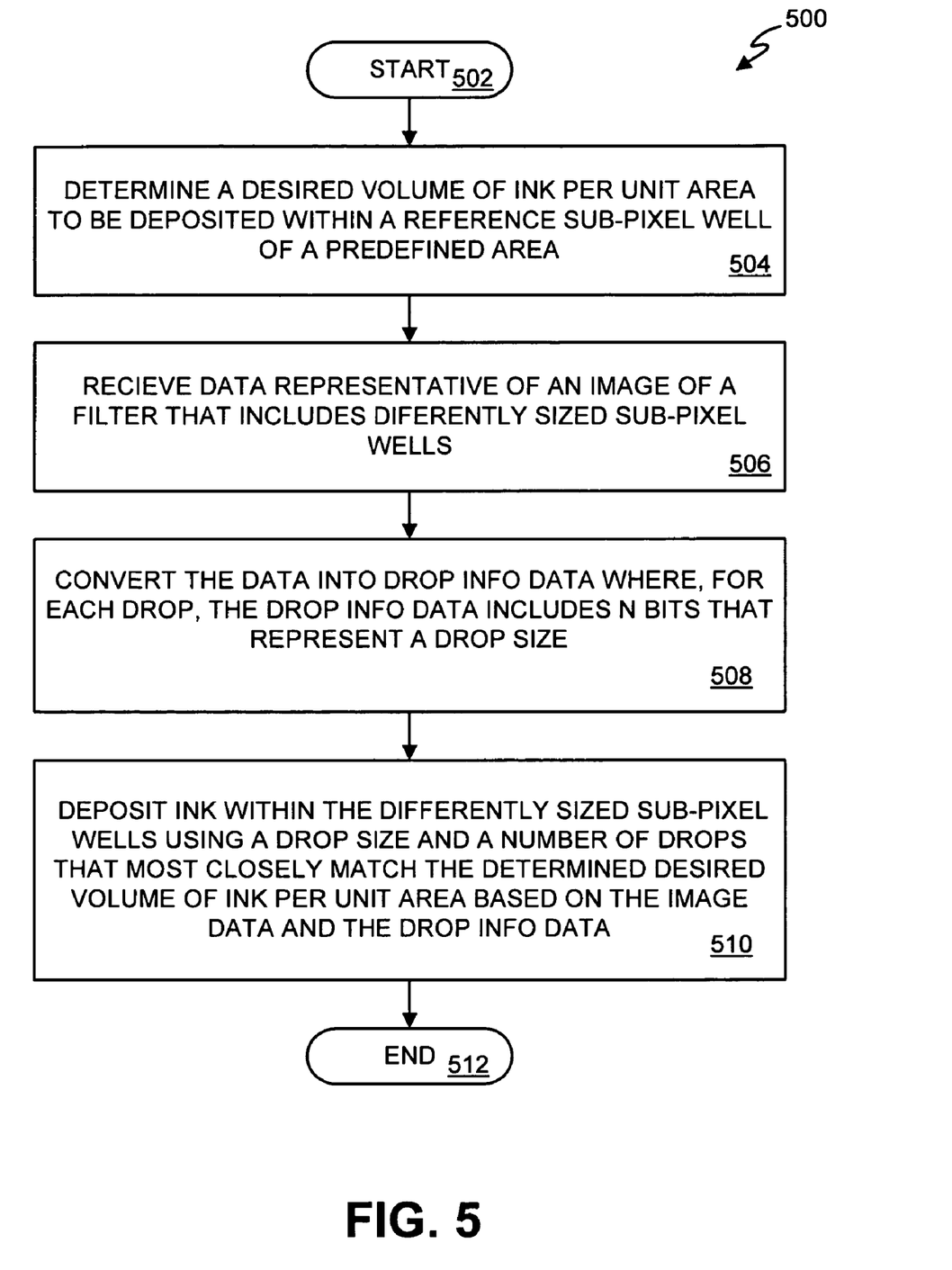
FIG. 5 is a flowchart illustrating an example embodiment of an additional method according to some embodiments of the present invention.

Turning to FIGS. 4 and 5, flowcharts illustrating example embodiments of precision printing methods 400, 500 using variable size drops are provided. It should be understood that the particular arrangement of elements in the flow charts of FIGS. 4 and 5, as well as the number and order of example steps of various methods discussed herein, is not meant to imply a fixed order, sequence, quantity, and/or timing to the steps; embodiments of the present invention can be practiced in any order, sequence, and/or timing that is practicable.

Referring to FIG. 4, a method of precision printing using variable drop sizes at a printing frequency substantially the same as the printing frequency using a fixed drop size begins at Step 402. In Step 404, a fire pulse database 300 such as that depicted in FIG. 3 is created. The information needed to populate such a database 300 may be determined experimentally via a calibration process. For example, for each nozzle, a range of voltage values may be tried until a desired drop size is achieved within an acceptable margin of error. Alternatively, for some print head assemblies that output a drop size that varies linearly with firing pulse voltage, the required pulse voltage may be calculated based upon manufacturer supplied data. In such embodiments, an experimentally determined correction factor may need to be employed to adjust for cross-talk and/or other issues that may effect drop size. In either case, a manufactured print head assembly may include a specified maximum and minimum drop size and/or a maximum and minimum fire pulse voltage. Based upon the desired printing resolution, a value of N may be selected to specify a number of bits to be used to separately identify $2^N-1$ different drop sizes within the specified maximum and minimum drop size range.

In Step 406, data representative of an image to be printed is received. In some embodiments, this data may be downloaded from a host 122 into a controller 102. In Step 408, the data is converted to pixel data by appending, or otherwise associating, N bits of information to each representation of a pixel within the data. The N bits per pixel may represent a drop size and, in some embodiments, a nozzle status to be used when printing the particular pixel. The nozzle status may be determined directly from the N bits by computing the union (logical OR) of the N bits. In some embodiments, unless the union of the N bits is zero, the nozzle is on. The drop size may also be determined directly from the N bits. For example, each bit value may specify an increasingly larger drop size between a fixed range of possible drop sizes. In some embodiments, a database 200 as depicted in FIG. 2 may be employed to specify a given drop size for each of the $2^N$ bit values except zero.

In Step 410, a print head 110 is controlled based upon the pixel data such that the drop size may be varied from pixel to pixel according to the pulse voltages used to trigger the nozzles 116 of the print head 110. In Step 412, the process 400 completes. (As stated above, pixel data may be generated before and/or during printing.) Turning to FIG. 5, a flowchart illustrating a second example embodiment of a precision printing method 500 using variable size drops is provided. In Step 502, the method begins. In Step 504, a desired volume of ink per unit area to be deposited with a reference sub-pixel well of a known area is determined. For example, on a substrate with a pre-formed pattern of sub-pixel wells, a reference well with a known area may be identified. A desired depth of ink within the well may be determined. The depth and area may then be used to determined the desired volume of ink per unit area. In some embodiments, an operator may provide the system 100 with the information based upon ink characteristics or other factors. Alternatively or additionally, the system 100 may determine the desired volume of ink per unit area to be deposited.

In Step 506, data representative of an image of a filter for a flat panel display to be printed is received. The filter may include sub-pixel wells that are of different sizes and may be differently sized from the reference well. In some embodiments, this data may be downloaded from a host 122 into a controller 102. In Step 508, the data is converted into drop information data. Drop information data may include a representation of the image in terms of a number of bits that specify a drop size for drops to be deposited in sub-pixel wells of the filter for a given nozzle of a print head. The bits may also indicate whether the nozzle is to be turned off for a given sub-pixel well. In Step 510, ink is deposited within the differently sized sub-pixel wells using a drop size and a number of drops that most closely match the determined desired volume of ink per unit area (determined in Step 504). This depositing is done based upon the image data and the drop information data. In Step 512, the method 500 completes.

The foregoing description discloses only particular embodiments of the invention; modifications of the above disclosed methods and apparatus which fall within the scope of the invention will be readily apparent to those of ordinary skill in the art.

Accordingly, while the present invention has been disclosed in connection with specific embodiments thereof, it should be understood that other embodiments may fall within the spirit and scope of the invention, as defined by the following claims.

The invention claimed is:

1. A method comprising:
   receiving data representative of an image;
   converting the data into pixel data including drop size information; and
   controlling a print head based on the pixel data,
   wherein the drop size information specifies a quantity of fluid per drop;
   wherein the pixel data includes pixels, each pixel is represented by N bits, and the N bits represent a drop size;
   wherein the drop size is related to a pulse voltage and the N bits specify a pulse voltage; and
   wherein the pulse voltage may be a voltage within a range of voltages from $V_{min}$ to $V_{max}$, and wherein a set of possible voltage values between $V_{min}$ to $V_{max}$ includes pulse voltage values that are stored in a database for each value of i from 1 to $(2^N-1)$.

2. The method of claim 1 wherein the image is of a color filter for a display and the print head includes a plurality of nozzles each adapted to deposit at least one drop of the fluid based on the drop size information on a substrate.

3. The method of claim 1 wherein the pixel data includes pixels, each pixel is represented by N bits, and a union of the N bits represents a nozzle status.

4. The method of claim 1 further including creating the database based upon a pulse voltage calibration of each nozzle of the print head for each desired drop size.

5. The method of claim 4 wherein calibration of each nozzle includes determining $2^N-1$ voltage values within the range of voltages from $V_{min}$ to $V_{max}$ that correspond to $2^N-1$ drop sizes wherein the $2^N-1$ drop sizes are evenly distributed among a range of drop sizes $D_{min}$ to $D_{max}$ wherein $D_{min}$ corresponds to $V_{min}$ and $D_{max}$ corresponds to $V_{max}$.

6. A method comprising:
   determining a desired volume of ink per unit area to be deposited within a first sub-pixel well, the first sub-pixel well having a predefined area; and
   based on data representative of an image of a filter including at least a second sub-pixel well having an area different than the predefined area, depositing ink within at least the second sub-pixel well using a drop size and a number of drops that most closely match the determined desired volume of ink per unit area.

7. The method of claim 6 wherein the image of the filter is an image representative of a color filter for a display.

8. The method of claim 6 wherein depositing ink includes controlling a print head based on the data representative of the image of the filter.

9. The method of claim 6, further comprising converting the data representative of the image of the filter into drop information data wherein:
   each drop is represented by N bits,
   the N bits represent a drop size, and
   a union of the N bits represents a nozzle status.

10. The method of claim 9, wherein depositing ink includes controlling a print head based on the drop information data.

11. An apparatus comprising:
    a controller including at least one driver;
    a print head coupled to the controller and adapted to be controlled by the driver based on pixel data; and
    a memory coupled to the controller and adapted to store data representative of an image converted into pixel data wherein:
    the pixel data includes a plurality pixels,
    each pixel is represented by N bits,
    the N bits represent a drop size, and
    a union of the N bits represents a nozzle status;
    wherein the driver includes logic adapted to convert the drop size into a pulse voltage operable to cause a nozzle of a plurality of nozzles of the print head to dispense a volume of fluid related to the drop size; and
    wherein the logic is adapted to relate each possible value of the drop size to a pulse voltage within a range of voltages from $V_{min}$ to $V_{max}$, and wherein a set of possible pulse voltage values between $V_{min}$ to $V_{max}$ includes pulse voltage values that are stored for each value of i from 0 to $(2^N-2)$.

12. The apparatus of claim 11 wherein the controller is adapted to receive the data representative of an image and convert the data into pixel data.

13. The apparatus of claim 11 further including:
    a database for storing each possible voltage value determined based upon a calibration of each nozzle of the print head, and
    wherein the database includes $2^N-1$ voltage values within the range of voltages from $V_{min}$ to $V_{max}$ that correspond to $2^N-1$ drop sizes wherein the $2^N-1$ drop sizes are evenly distributed among a range of drop sizes $D_{min}$ to $D_{max}$ wherein $D_{min}$ corresponds to $V_{min}$ and $D_{max}$ corresponds to $V_{max}$.

14. The apparatus of claim 11 wherein the logic is adapted to relate each possible value of the drop size to a pulse voltage within a range of voltages from $V_{min}$ to $V_{max}$, and wherein a set of possible pulse voltage values between $V_{min}$ to $V_{max}$ includes pulse voltage values that equal $V_{min}+[i*(V_{max}-V_{min})/(2^N-2)]$ for each value of i from 0 to $(2^N-2)$, wherein the memory includes a table of correction factors determined to compensate for variations in a volume of ink deposited for a given pulse voltage between different nozzles of the print head, the correction factors having been determined for each drop size of each nozzle during an initial print head calibration, and wherein the logic is further adapted to adjust the pulse voltage for the nozzle by multiplying the pulse voltage value by a corresponding correction factor from the table of correction factors.

15. A method comprising:

receiving data representative of an image;

converting the data into pixel data including drop size information; and controlling a print head based on the pixel data, wherein the drop size information specifies a quantity of fluid per drop;

wherein the pixel data includes pixels, each pixel is represented by N bits, and the N bits represent a drop size;

wherein the drop size is related to a pulse voltage and the N bits specify a pulse voltage; and wherein the pulse voltage may be a voltage within a range of voltages from $V_{min}$ to $V_{max}$, and wherein a set of possible voltage values between $V_{min}$ to $V_{max}$ includes pulse voltage values that equal $V_{min}+[i*(V_{max}-V_{min})/(2^N-2)]$ for each value of i from 0 to $(2^N-2)$.

16. The method of claim 15 further comprising adjusting for variations in a volume of ink deposited for a given pulse voltage between different nozzles of the print head by multiplying each of the pulse voltage values by a correction factor determined for each drop size of each nozzle during an initial calibration.

17. The method of claim 15 further comprising determining a correction factor for each of a plurality of nozzles by which to adjust the pulse voltage values in order to compensate for variations in a volume of ink deposited for a given pulse voltage between different nozzles of the print head.

* * * * *